(12) United States Patent
Knight et al.

(10) Patent No.: US 6,256,143 B1
(45) Date of Patent: Jul. 3, 2001

(54) STEREOSCOPIC, LONG-DISTANCE MICROSCOPE

(76) Inventors: Douglas M. Knight, 68 Upper Creek Rd., Stockton, NJ (US) 08559; Robert Machemer, 1532 Pinerest Rd., Durham, NC (US) 27705; Ronald F. Overaker, 2618 Plesant Green Rd., Durham, NC (US) 27705; Brian C. Dodge, 529 Lakeshore Dr., Hillsborough, NC (US) 27278

( * ) Notice: Subject to any disclaimer, the term of this patent is extended or adjusted under 35 U.S.C. 154(b) by 0 days.

(21) Appl. No.: 09/423,819
(22) PCT Filed: Feb. 19, 1999
(86) PCT No.: PCT/US99/03303
§ 371 Date: Feb. 14, 2000
§ 102(e) Date: Feb. 14, 2000
(87) PCT Pub. No.: WO99/47949
PCT Pub. Date: Sep. 23, 1999

Related U.S. Application Data
(60) Provisional application No. 60/078,146, filed on Mar. 16, 1998.

(51) Int. Cl.[7] ............................. G02B 21/22; G02B 17/00
(52) U.S. Cl. ......................... 359/376; 359/366; 359/368
(58) Field of Search ..................................... 359/350–351, 359/353, 358, 359–360, 364–366, 368–390, 725–731, 856–861

(56) References Cited

U.S. PATENT DOCUMENTS

| 2,520,635 | 8/1950 | Grey | 359/365 |
|---|---|---|---|
| 2,753,760 | * 7/1956 | Braymer | 359/366 |
| 2,801,570 | * 8/1957 | Nomarski et al. | 359/366 |
| 3,055,259 | * 9/1962 | Dietrich | 359/366 |
| 4,059,336 | 11/1977 | Hopkins | 359/380 |
| 5,011,243 | 4/1991 | Doyle et al. | 359/350 |

FOREIGN PATENT DOCUMENTS 452 963 * 10/1991 (EP) ..................................... 359/368

* cited by examiner

Primary Examiner—Thong Nguyen
(74) Attorney, Agent, or Firm—Woodbridge & Associates, P.C.; Richard C. Woodbridge

(57) ABSTRACT

A stereoscopic, long-distance microscope is capable of stereoscopically viewing targets within the range of 100 mm to 300 mm from the front lens element. The system preferably comprises: a front lens element having a diameter $D_{fl}$ for receiving light rays from the target; a rear mirror having a diameter $D_{rm}$ for receiving light rays from the front lens element; a secondary mirror located on the rear surface $R_2$ of the front lens element for receiving light reflected from the rear mirror element; and, an angled mirror located between the secondary mirror and the stereoscopic eyepiece in its turn receiving light rays reflected from said angled mirror and presenting them to both eyes of the viewer. The diameter $D_{fl}$ of the front lens element is preferably significantly smaller than the diameter $D_{rm}$ of the rear mirror element.

4 Claims, 6 Drawing Sheets

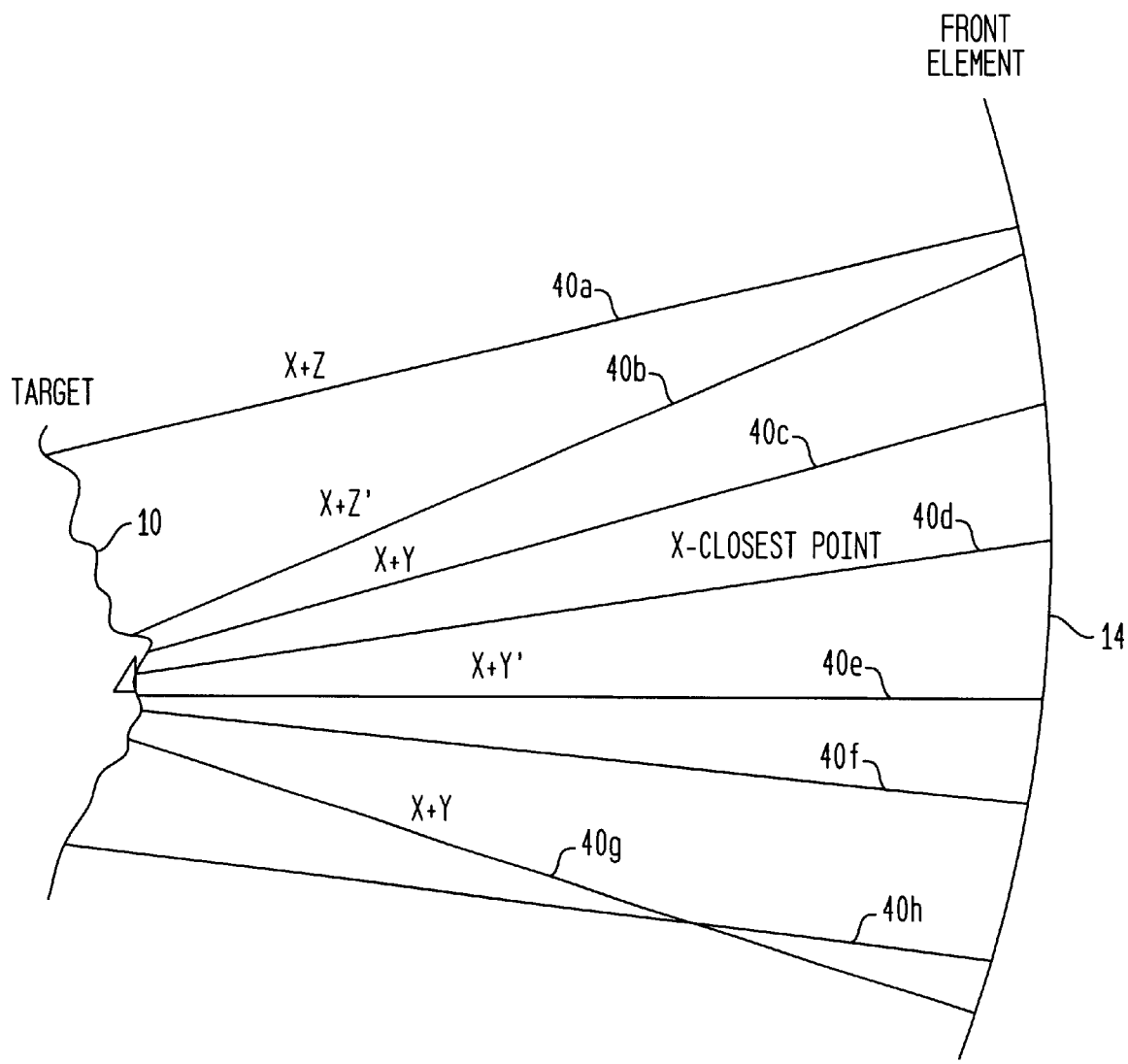

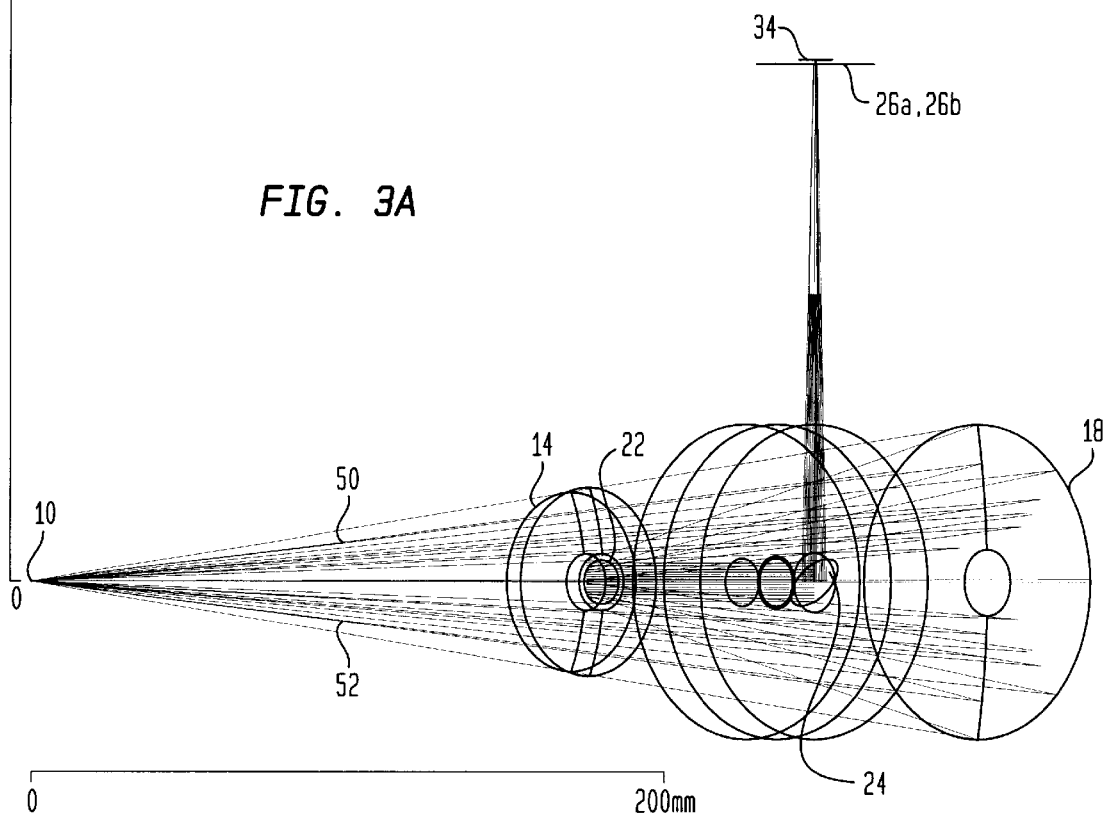

STEREOSCOPIC, LONG-DISTANCE MICROSCOPE

This application is a 371 of PCT/US99/03303 filed Feb. 19, 1999, which claims benefit of Provisional No. 60/078, 146 filed Mar. 16, 1998.

BACKGROUND OF THE INVENTION

1. Field of the Invention

The invention generally relates to an optical microscope and, in particular, a stereoscopic, long-distance microscope having a target in the range of 100 mm–300 mm from the front optical element of the microscope.

2. Description of Related Art

The prior art includes a significant number of telescopes and the like that have the following basic structure: a convex front lens; a concave rear mirror for receiving light from the front lens; a secondary mirror located on the backside of the front lens for receiving light focused from the rear mirror; an angled mirror, or the like, for receiving reflected light from the secondary mirror; and, an eyepiece for viewing the image reflected from the angled mirror. The target is typically located at a substantial distance from the front lens and the front lens and rear mirror have substantially the same diameter. An example of a well known telescope for observing astronomical events or observing or photographing terrestrial events, is the Questar 3½ sold by the Questar Corporation, 6204 Ingham Road, New Hope, Pa., 18938.

Other optical devices which include a compound refractive first front lens, a concave primary rear mirror, a secondary mirror and a mechanism for focusing the result onto an eyepiece are found in the following patent disclosures: U.S. Pat. Nos. 2,748,658; 2,726,574; 3,532,410; and, 5,471,346.

U.S. Pat. Nos. 4,755,031 and 5,181,145 describe similar structures. In particular, U.S. Pat. No. 5,181,145 discloses a beam that is reflected from a secondary, convex mirror which impinges on a beam splitter thereby producing two images at two different points. U.S. Pat. No. 4,835,380 also describes the use of a beam splitter at the output end of a similar structure.

The following patents disclose related structures, but without a compound refractive lens at the front end: U.S. Pat. Nos. 2,753,760; 3,411,852; 3,468,597; 5,159,495; and, 5,161,051.

While the foregoing prior art disclosures have some nominal similarity to the present invention, nevertheless, none of them appear to describe a structure or use which permits the device to be used as a stereoscopic, long-distance microscope. Such a device can be especially useful for unique applications such as neuro-surgery, high-speed material processing and the inspection of complex materials for flaws and irregularities.

It was in the context of the foregoing need that the present invention arose.

SUMMARY OF THE INVENTION

Briefly described, the present invention comprises a stereoscopic, long-distance microscope capable of imaging targets at a distance between 100 mm–300 mm from the front lens of the instrument while providing significant three-dimensional stereoscopic detail. The microscope basically comprises: a front compound convex refractory lens having a diameter $D_{fl}$ for receiving light rays from the target; a rear concave primary reflective mirror having a diameter $D_{rm}$ for receiving light rays from the front lens; a convex secondary mirror located on the backside of the front lens for receiving light rays from the primary mirror; an angled plane or flat mirror for receiving the light rays focused from the secondary mirror; and, a stereoscopic eyepiece for receiving the light rays from the angled mirror. In addition, an intermediate, convex lens may be located between the secondary mirror and the angled mirror to further assist in the focusing of light rays from the front lens to the rear mirror. The diameter $D_{fl}$ of the front lens is smaller than the diameter $D_{rm}$ of the rear mirror. This combines with the location of the target within 100 to 300 mm of the front lens to enable the front element to gather light at such an angle from the target that extraneous light is eliminated from the light bundles that emerge therefrom. The light bundles are refracted, focused, received and divided by the stereo eyepiece and finally combined by the viewer into one three-dimensional image in the same fashion that normal eyes create one stereo image. The result is a realistic, three-dimensional view of an object located at a significant distance from the front lens but greatly enlarged.

The invention may be more fully understood by reference to the following drawings.

BRIEF DESCRIPTION OF THE DRAWINGS

FIG. 2 illustrates the different lengths that light rays travel between the target and the front element of the apparatus and further indicating that a variety of different information about the target is inherently captured by the different ray lengths.

FIG. 3A illustrates how rays from a red and green source are collected respectively in the right and left eyepieces of the system.

FIGS. 3B and 3C illustrate in greater detail how the green rays representing the background objects focus earlier in the eyepieces of the system than the red rays which represent the foreground objects.

DETAILED DESCRIPTION OF THE INVENTION

During the course of this description like numbers will be used to identify like elements according to the different figures that illustrate the invention.

Figure 1:
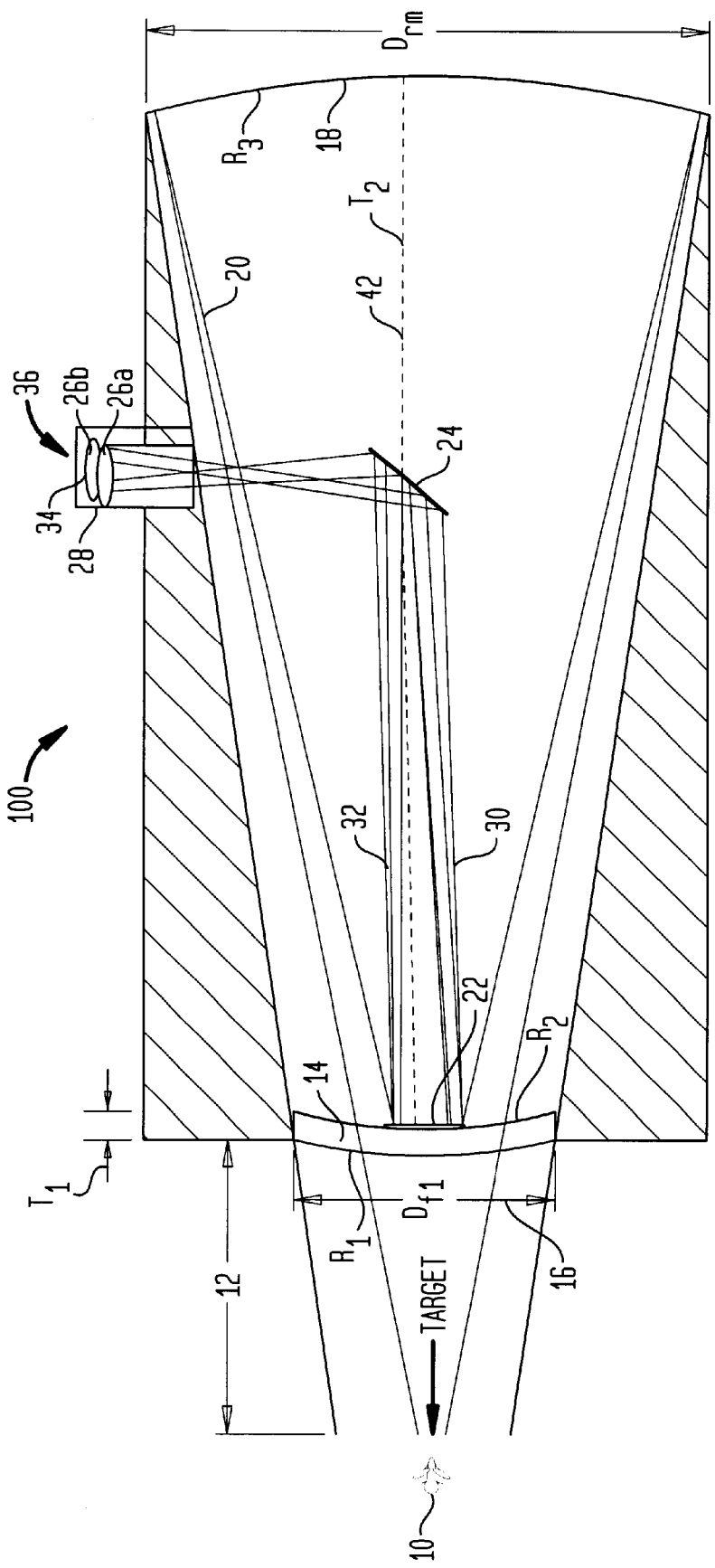
FIG. 1 is an elevated, cross-sectional view of the stereoscopic, long-distance microscope according to the preferred embodiment of the invention.

The invention 100, according to the preferred embodiment thereof, is illustrated in FIG. 1. The inventive system 100 depends for its accuracy and stereoscopic effectiveness on the fact that the target 10 is located within the prime focal range 12 of the optical system, namely 100 to 300 mm. The location of the target 10, in turn, allows the front element of 14 of the system to gather light at such an angle from the target 10, that extraneous light is eliminated from the light bundle 16 so that the light bundle can, in turn, transfer to the main, rear, concave mirror 18 only those rays which image the total target 10. The front element 14 comprises a convex, refractory 25 lens having a diameter $D_{fl}$ and a secondary mirror 22 located on the rear surface thereof. The rear mirror 18 has a diameter $D_{rm}$ which is necessarily greater than Dfl. The preferred range for $D_{fl}$ is 55 to 75 mm and for $D_{rm}$, 95 to 115 mm, with preferred values of $D_{fl}$=65 mm and $D_{rm}$=105 mm. Rays 20 are of varied lengths which are determined by the shape of the target 10. The larger, main, rear mirror 18 captures the variable-length rays 20 and reflects them to the secondary mirror 22 in such a way that the shape of the target 10 is maintained by the pattern which the rays 20 have created. This pattern shows the target 10 complete in depth. That information is further transmitted from the secondary mirror 22 by an angled flat mirror 24 to the two eye pieces 26a and 26b of the stereoscopic viewer 36, which are so placed that at the viewer's eye-level 28 that they are at the prime focal plane established by the optics of the instrument 100. The complete information about the target 10 conveyed by the light bundle can now be separated by the two stereoscopic eye pieces 26 so that the information conveyed by the right half of the ray bundle 30 can be distinguished by the eye from that conveyed by the left half of the ray bundle 32. These images, collectively referred to as 34, are then combined by the viewer into one three-dimensional image exactly as images are combined in the normal use of the eyes. The function of the observer's eyes in transmitting images to the optic nerves is thus central to the invention, because it confirms the validity of the information pathway described from the target 10 to the combined images 34. This pathway is, in fact, an exact replication of stereo vision in the eye, but with an image greatly enlarged by means of the total optical system 100. The total system 100 is thus an optical replication of the normal visual system when both human eyes are involved.

The path followed by the light bundle 40 through the optical system contains and transmits the essential information about the three-dimensional target 10. The distinction among the lengths of the various rays 40a–40h becomes crucial at this point because they display the contour of the target which is then available to the stereo eyepieces 26a and 26b as shown in FIG. 2. This may be best understood by comparing with it once again the information provided normally by the two eyes of a human being. These receive three-dimensional images by recording and combining through the optic nerves, the varied light-ray lengths which describe the shape of an object. The contour of the object is perceived because of these variable ray lengths; similarly the optical system 100 sees and records these varied lengths and transmits them to the eyepieces 26a and 26b which then distinguish for the use of the eyes these varied lengths 40a–40h in the bundle of light rays. This is possible because the differing focus of the two eyepieces 26a and 26b as shown in FIG. 3 record sharply the rays of different length which have been conveyed to the eyepieces. These two eyepieces (26a and 26b) can make use of the full information conveyed by the light bundles 40 so that the observer 28 in turn sees the three-dimensional target 10 in greatly magnified form.

The theory of operation of the stereo microscope reveals the fact that a target 10 in close proximity to the unique optical system 100 produces a stereoscopic image not available to optics designed to view more distant targets.

If the target 10 was at any other distance—even as close as 9 or 10 feet—the light rays 30 and 32 would transmit to the optic the image of a flat surface, because these rays 30 and 32 would be close enough to equal in length so that they could not record topographical distinctions. These would appear only as a plane surface image with whatever depth of field the optic could capture. Note further that this kind of depth would be the result of decreasing the aperture of the lens 14 so that one sees objects before and behind the target focal plane with acceptable clarity; it is not stereo imaging.

An optical system 100, in order to capture stereo information, must meet two (2) conditions: (a) it must have some distance from the target 10, but (b) it must not be too far from the target 10. An optic positioned very close to the target 10 will clearly "see" only the rays that come directly toward it; an optic too far away will not distinguish the variable ray lengths; as seen above they will at best become relatively in focus. But within a restricted range, theory and practice meet, so that distinctions of topography can be made and recorded. These, in turn, can be segregated by the independent focus of the eyepieces 26a and 26b so that the target 10 is observable in both its near and far contours, which are then assembled by the eye 36 to give one complex image. (It has already been indicated that great depth of field alone does not produce a true stereo effect). The stereo image is captured because the optic transmits two essential types of information: first, it records the variations in length of the rays 30 and 32 observed, and second, it records oblique views of the target 10 which are determined by variations in ray length. The curve of the front element 14 makes this type of recording possible; all this information is then both magnified and distinguished by the optical sequence to give different but complementary information to the two stereo eyepieces.

Figure 3C:
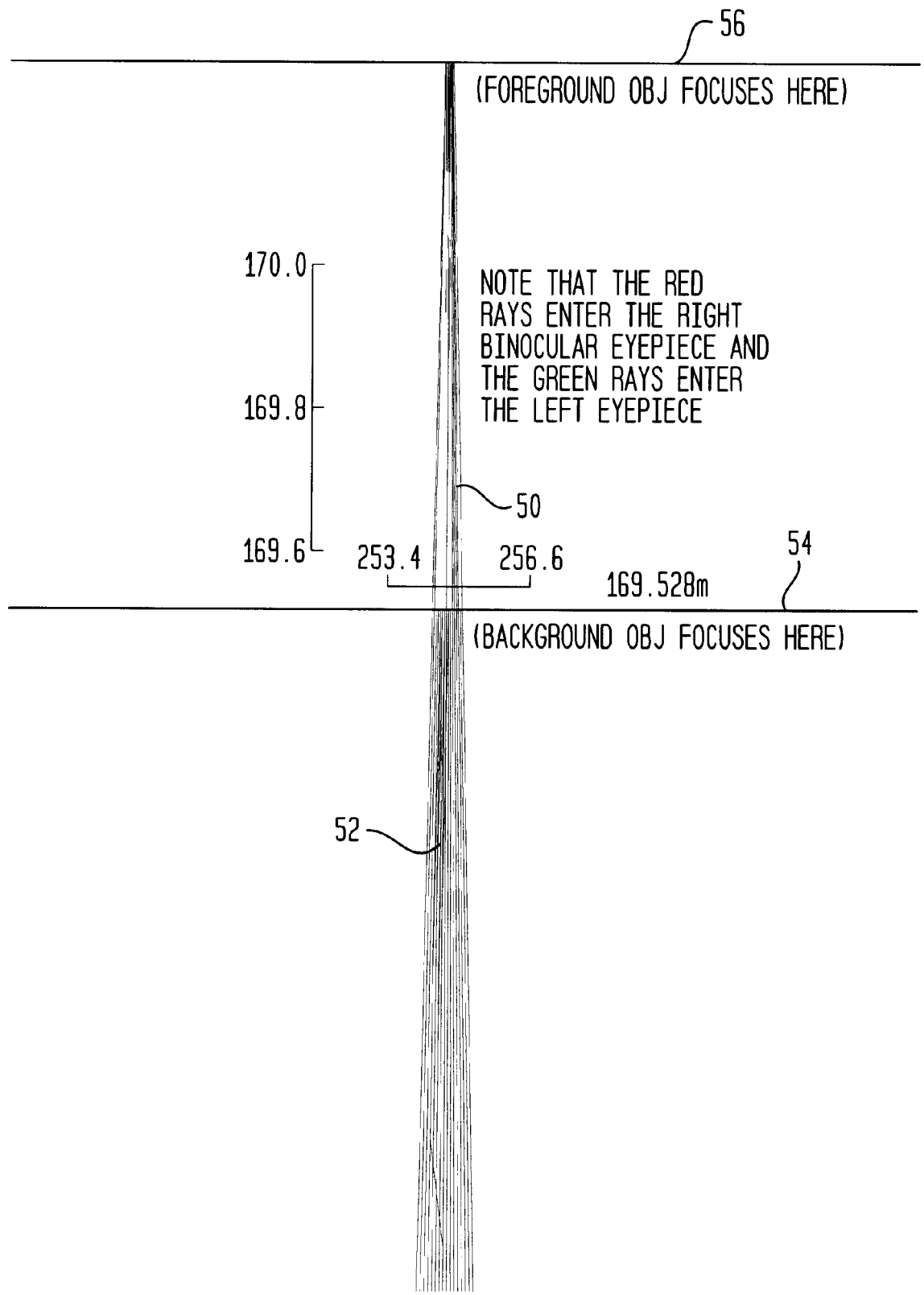

The theory of operation is illustrated in greater detail in FIGS. 3A–3F. FIG. 3A illustrates rays from a red ray 50 and a green ray 52 separated by five microns in the Z-axis. The binocular eyepieces 26a and 26b collect the red 50 and green 52 rays for the right and left eye, respectively. It should be further noted that the precision of this optical sequence distinguishes it sharply from any superficial effect created by light dispersion. FIGS. 3B and 3C illustrate how the red rays 50 are intercepted by the right eyepiece 26a and the green rays 52 are intercepted by the left eyepiece 26b. FIG. 3C, which is a continuation of FIG. 3B, illustrates how the green rays 52, which represent background objects, focus earlier at a plane 54 located at 169.528 mm and how the red rays 50, which represent the foreground objects, focus at a further plane 56 located at 170.334 mm.

Figure 3D:
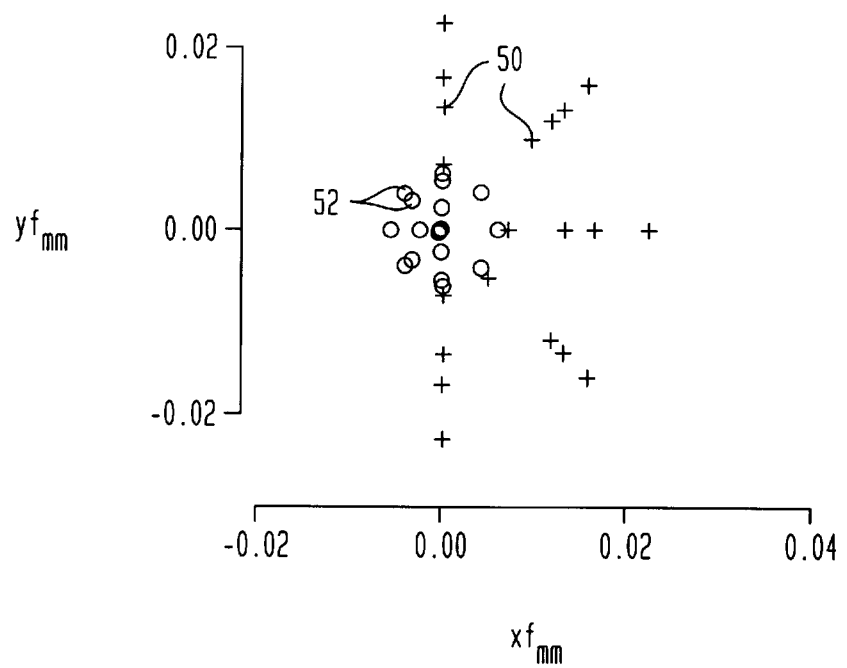
FIG. 3D represents the manner in which the green rays, representing the background objects, focus at a point earlier than the red rays.
Figure 3E:
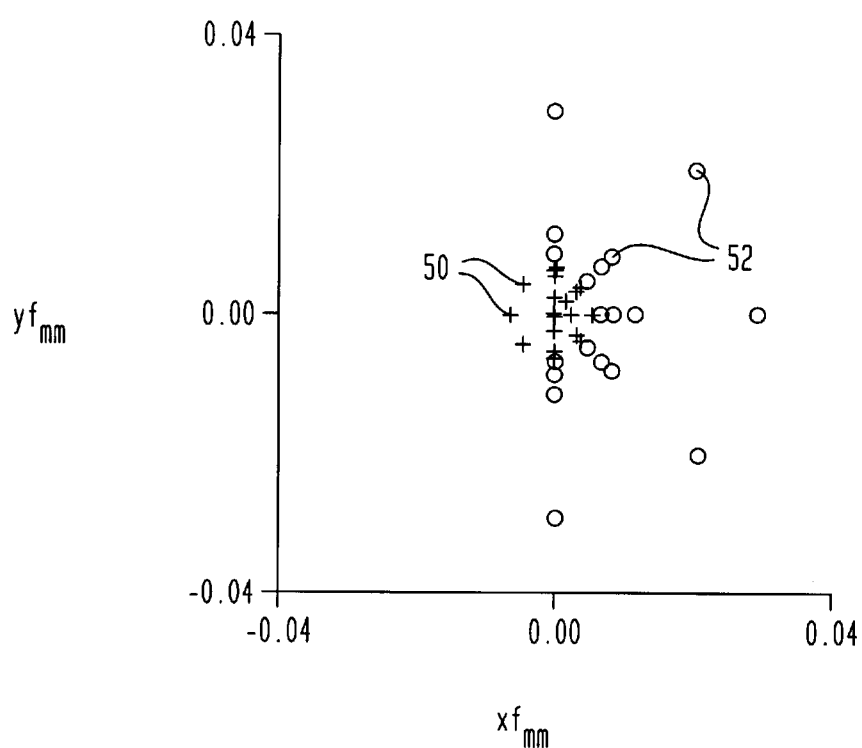
FIG. 3E illustrates the opposite of FIG. 3D, namely that the red rays, which represent the foreground objects, focus later than the green rays which represent background objects.

FIG. 3D essentially illustrates the same fact, namely that the green rays 52 converge at plane 54 forming a focused background object. In other words, the green rays are clustered closer to the center of the focus than the red rays 50. Conversely, FIG. 3E illustrates the scattering and clustering of rays at the foreground plane 56, showing how the red rays 50 are clustered and the green rays 52 are less focused.

Figure 3F:
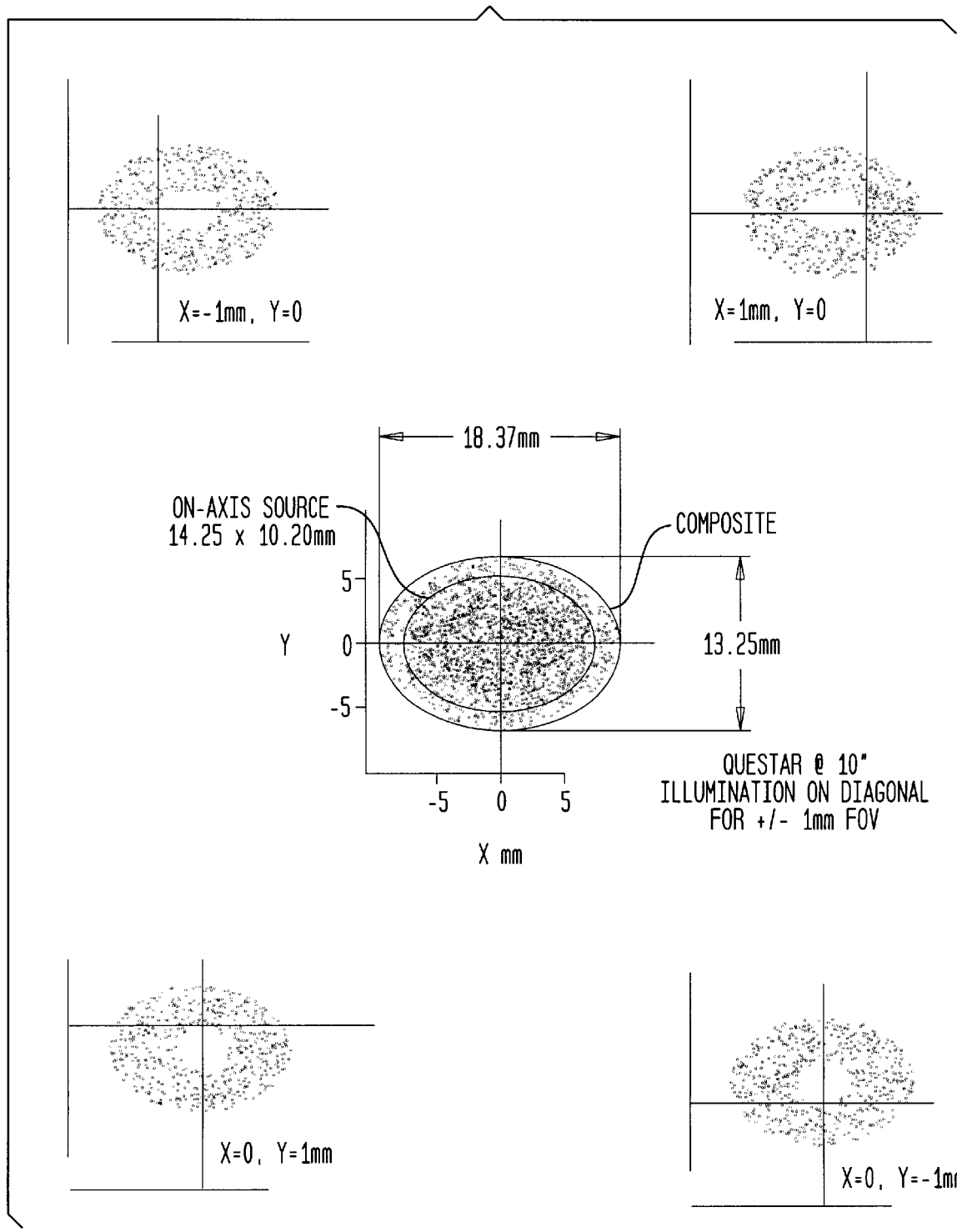
FIG. 3F illustrates how rays from different sources, represented by different colors, form a composite image at different focal points.

Lastly, FIG. 3F illustrates how a composite object is formed from at least four sets of rays of different colors.

The specific dimensions and relationships of the optical system 100 are according to the preferred embodiment:

Type: Maksutov Cassegrain Catadioptric

Working Range: Distance from target to front element—between 100 and 300 mm

Open Aperture: 63.5 mm (or 2.5 inches)

Entrance Pupil: 104.14 mm (or 4.1 inches
Numerical Aperture/

| Relative Aperture: | | |
|---|---|---|
| Object Distance | n.a. | f/no |
| 457.2 mm (or 18 inches) | .065 | 7.7 |
| 355.6 mm (or 14 inches) | .083 | 6.0 |
| 254.0 mm (or 10 inches) | .115 | 4.3 |
| 152.4 mm (or 6 inches) | .142 | 3.5 |

Spatial Resolution: Better than 1.25 microns at 150 mm, less than 1 micron at 100 mm Corrector Lens: BK-7, Magnesium Fluoride coated (standard), $D_{fl}$=63.5 mm (or 2.5 inches) diameter where:
$R_1$=front surface of lens 14=58.5 mm
$R_2$=rear surface of lens 14=62.0 mm
$T_1$=midpoint thickness of lens 14=8.10±0.03 mm Primary Mirror: Pyrex®, Aluminum coated, AlSiO4 overcoated, $D_{rm}$=104.14 mm (or 4.1 inches) diameter where:
$T_2$=distance from front lens element 14 to surface of rear mirror 18=285.98±0.60 mm.

Secondary Mirror: R2 surface of corrector, Aluminum coated, AlSiO4 overcoated, 16.5 mm (or 0.65 inches) diameter Back Focal Distance: 2.75 inch minimum Format: Diffraction limited field, 18 mm Baffling: Helix in central tube, all interial surfaces anti-reflection painted Barrel: 6061 Aluminum, machine from seamless stock, integrated lens cell, black anodized, length 254.0 mm (or 10 inches), outside diameter 11.43 mm (or 4.5 inches, weight 2.57 kg (or 5 pounds).

In summary, this invention 100 employs a unique set of conditions to achieve its result. The target 10 rests within a critical range of distance (100–300 mm) from the front element 14 of the lens; rays 40a–40h from the target 10 thus diverge from the optical axis 42 at the specific angles which record the contours of the target 10; the ray patterns created are both concentrated and amplified by the various elements of the optical system 100 so that they become available to the two eyepieces 26a and 26b which are positioned to bring into three dimensional focus, the full array of light rays captured by the optical system 100.

The present invention has several advantages over the prior art. First, the user can see a total object or target 10 in its full depth and detail, whereas a prior art monoscopic view reduces the actual object to a two-dimensional approximation. Second, as a result, one can derive information from certain highly critical procedures which require distance from the target and at the same time the ability to manipulate it without damage to either target or user. Examples would include neuro-surgery, high-speed material processing, and the inspection of complex materials for flaws and irregularities. For full effectiveness, all of these procedures require significant distance from the target and extreme resolution.

In order to achieve the foregoing, the present invention 10 has several features that are unique. First, the focal length of the microscope is neither directly adjacent to the front lens nor at a great distance such as virtual infinity, but rather preferably in the range of 100 to 300 mm. Accordingly, it is a true stereoscopic long-distance microscope. Second, the front lens element 14 is significantly smaller in diameter than the rear lens element 18 (i.e., $D_{rm}$>$D_{fl}$) which, in part, permits focusing at distances such as 100 mm to 300 mm. The major consequence of this arrangement is the noticeable stereoscopic effect achieved.

While the invention has been described with reference to the preferred embodiment thereof, it will be appreciated that various modifications may be made to the structure and theory of the invention, without departing from the spirit and scope of the invention as a whole.

We claim:

1. A stereoscopic, long-distance microscope apparatus (100) for stereoscopically examining a target (10), said apparatus (100) comprising:

a front lens means (14) having a diameter $D_{fl}$ for receiving light rays from said target (10), said front lens means (14) having an object side surface and an image side surface;

a rear mirror means (18) having a diameter $D_{rm}$ for receiving light rays from said front lens means (14), said rear mirror means (18) having an object side surface that faces the image side surface of said front lens means (14), and wherein the diameter $D_{fl}$ of said front lens means (14) is less than the diameter $D_{rm}$ of said rear mirror means (18);

a secondary mirror means (22) for receiving light rays from said rear mirror means (18), said secondary mirror means (22) being located on said image side surface of said front lens means (14);

an angled-mirror means (24) for receiving light rays from said secondary mirror means (22); and, an eyepiece means (36) for viewing the light rays from said angled mirror means (24), said eyepiece means (36) comprising a stereoscopic eyepiece suitable for use by both eyes, wherein said light rays viewed by human eyes through said eyepiece provide a stereoscopic, three-dimensional view of said target (10) and wherein said target (10) is located within 100 mm to 300 mm of said front lens means (14).

2. The apparatus of claim 1 wherein said diameter $D_{fl}$ of said front lens means (14) is in the range of 55 to 75 mm.

3. The apparatus of claim 2 wherein said diameter $D_{rm}$ of said rear mirror means (18) is in the range of 95 to 115 mm.

4. The apparatus of claim 3 wherein said light rays cross paths prior to impinging upon said eyepiece means (36).

* * * * *